(12) United States Patent
Calliari

(10) Patent No.: US 9,086,693 B2
(45) Date of Patent: Jul. 21, 2015

(54) SAFETY BRAKE DEVICE FOR MOVING MACHINE ELEMENTS

(76) Inventor: Umberto Calliari, Romeno (IT)

( * ) Notice: Subject to any disclaimer, the term of this patent is extended or adjusted under 35 U.S.C. 154(b) by 79 days.

(21) Appl. No.: 13/575,175

(22) PCT Filed: Jan. 24, 2011

(86) PCT No.: PCT/EP2011/000288
§ 371 (c)(1),
(2), (4) Date: Sep. 17, 2012

(87) PCT Pub. No.: WO2011/091976
PCT Pub. Date: Aug. 4, 2011

(65) Prior Publication Data
US 2013/0001028 A1    Jan. 3, 2013

(30) Foreign Application Priority Data
Jan. 27, 2010 (EP) .................................... 10000823

(51) Int. Cl.
| F16P 3/12 | (2006.01) |
| F16D 49/00 | (2006.01) |
| G05B 19/042 | (2006.01) |
| B23Q 11/00 | (2006.01) |
| F16P 3/14 | (2006.01) |
| G05B 9/02 | (2006.01) |
| G05B 19/4061 | (2006.01) |

(52) U.S. Cl.
CPC ........ *G05B 19/0428* (2013.01); *B23Q 11/0082* (2013.01); *B23Q 11/0092* (2013.01); *F16P 3/14* (2013.01); *G05B 9/02* (2013.01); *G05B 19/4061* (2013.01)

(58) Field of Classification Search
USPC ............. 188/110; 83/DIG. 1, 58, 471.2, 62.1, 83/477.2, 477.1, 74, 487, 581, 397.1, 781, 83/365; 144/356, 329, 426, 427; 340/555–556
See application file for complete search history.

(56) References Cited

U.S. PATENT DOCUMENTS

| 4,679,645 A * | 7/1987 | Galloway et al. ............ 180/65.8 |
| 5,486,691 A * | 1/1996 | Dieterle ......................... 250/221 |
| 5,880,954 A * | 3/1999 | Thomson et al. ............... 700/79 |
| 2003/0164447 A1* | 9/2003 | Kudo et al. ................... 250/221 |
| 2007/0203630 A1* | 8/2007 | Vitale et al. .................... 701/50 |

(Continued)

FOREIGN PATENT DOCUMENTS

| EP | 0995942 A1 | 4/2000 |
| EP | 1662349 A1 | 5/2006 |

(Continued)

*Primary Examiner* — Anna Momper
*Assistant Examiner* — San Aung
(74) *Attorney, Agent, or Firm* — Robert Curcio; DeLio Peterson & Curcio, LLC

(57) ABSTRACT

A safety brake device for moving machine elements to prevent injury to the extremities of the operator of a machine if the distance of said operator from the moving machine element is less than a defined safety area. The device is characterized by an arrangement for detecting the operator position, in order to permit operation of the machine only if the operator remains within the defined working area, an arrangement for detecting the position of the extremities of the operator within a predefined safety zone, which enables the required work activities to be performed, and a brake device, by means of which the moving machine element can be immediately stopped if the extremities of the operator go beyond the safety area.

16 Claims, 2 Drawing Sheets

(56) References Cited

U.S. PATENT DOCUMENTS

Figure 1:
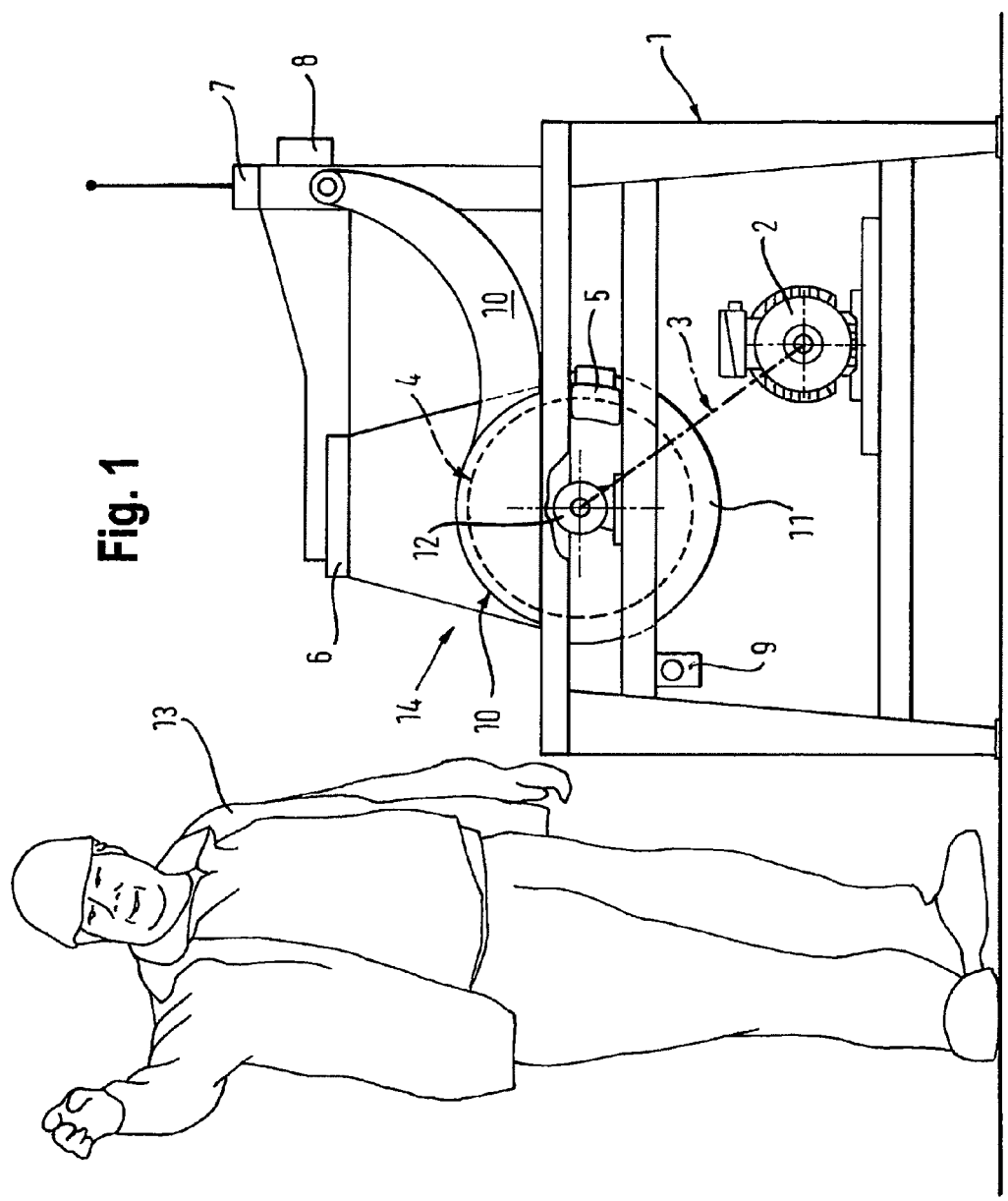

| | | | |
|---|---|---|---|
| 2007/0229298 A1* | 10/2007 | Frederick | 340/825.69 |
| 2008/0018472 A1* | 1/2008 | Dasilva et al. | 340/572.4 |
| 2008/0114519 A1* | 5/2008 | DuFaux et al. | 701/70 |
| 2010/0194187 A1* | 8/2010 | Howard | 303/162 |
| 2012/0012415 A1* | 1/2012 | Oettinger | 180/272 |

FOREIGN PATENT DOCUMENTS

| | | |
|---|---|---|
| FR | 2779669 A1 | 12/1999 |
| WO | WO 2007/060698 A1 | 5/2007 |

* cited by examiner

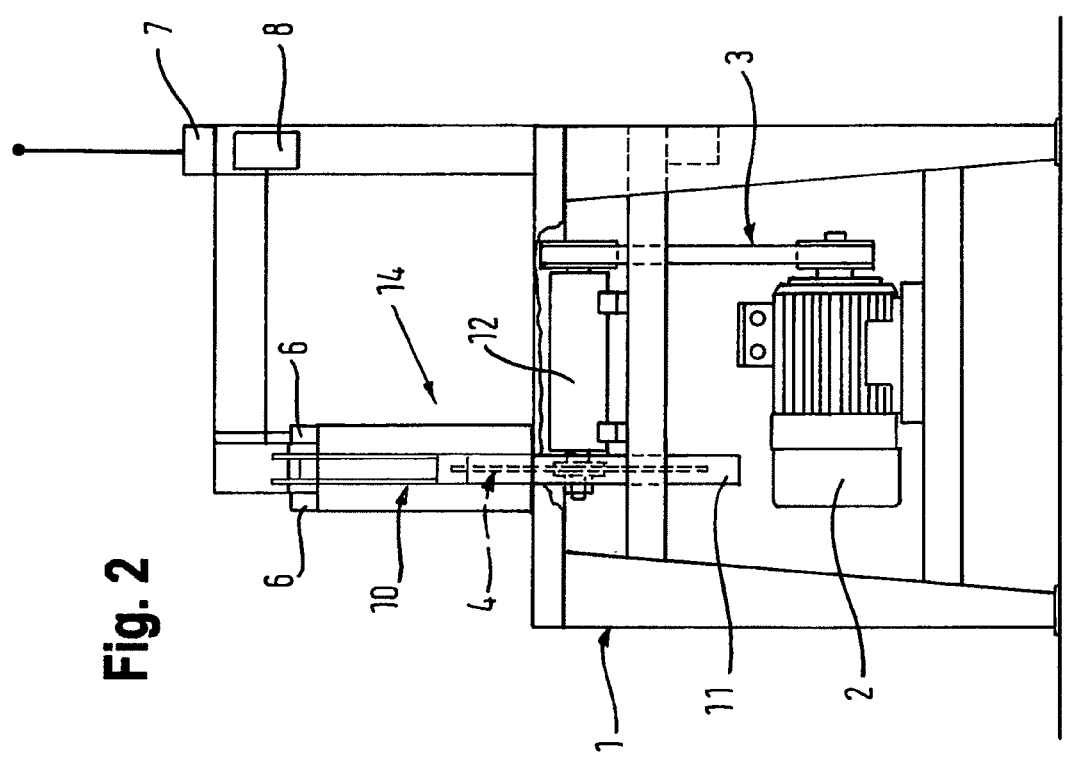

SAFETY BRAKE DEVICE FOR MOVING MACHINE ELEMENTS

BACKGROUND OF THE INVENTION

1. Field of the Invention

The invention relates to a safety brake device for moving machine elements designed to prevent injuries to the extremities of the operator of a machine 2. Description of Related Art A number of safety devices are already known which are intended to reduce the danger of accidents to the operator from moving machine elements such as tools, blades, presses, or similar where the workpieces are fed or removed manually.

These safety devices are in most cases very simple in design and do not offer full protection for the operator, since these only protect parts of the machine elements or tools, or the machine elements have a relatively long stopping time and it is thus still possible to reach into the hazardous area.

Most of the safety devices currently known consist of separating mechanical safety covers which partially cover the hazardous areas, or emergency stop devices which cut off the energy supply and are tripped manually or through contact with switching devices. Nonetheless, a considerable residual hazard remains since, due to their rotary or kinetic energy, the moving machine elements are not stopped immediately. Even though the drives of the machines are increasingly equipped with brakes, the stopping times in each case amount to several seconds, which means that injuries cannot be prevented.

A safety device is also already known in which the saw blade of a circular saw is brought to a standstill in the event of an emergency by means of an aluminum claw. However, a disadvantage here is that the aluminum claw needs to be replaced after each use.

BRIEF SUMMARY OF THE INVENTION

In order to eliminate the disadvantages described, the invention is therefore based on the problem of creating a safety brake device for moving machine elements which can be used universally and is of simple construction, which is easy to maintain and at the same time offers a greater protective effect for the operator than the previously known safety and protection devices.

The present invention is directed in a first aspect to a safety brake device for moving machine elements to prevent injury to the extremities of an operator of a machine for distances of the operator from the moving machine element that is less than a defined safety area, comprising: a transponder worn, directly or indirectly, by the operator in an arrangement for detecting the operator's position, in order to permit operation of the machine only if the operator remains within the defined working area; photoelectric sensors or laser scanners attached to the machine in an arrangement for detecting the position of the operator's extremities within a predefined safety zone which enables the required work activities to be performed; and a brake device immediately stopping the moving machine element when the operator's extremities go beyond the safety area, wherein the brake device includes a brake caliper which acts on the moving machine element via a control.

The control for the brake device may function electrically or electronically. The brake caliper may be electrically operable, hydraulically operable, pneumatically operable, or mechanically operable.

The device may be activated automatically each time the machine is started.

The machine is designed to be shut down as soon as the operator leaves the defined working area.

In a second aspect, the present invention is directed to a safety brake device for moving machine elements to prevent injury to the extremities of the operator of a machine when the distance of said operator from the moving machine element is less than a defined safety area, comprising: a detector arranged for detecting the operator's position, in order to permit operation of the machine only if the operator remains within the defined working area; a detector arranged for detecting the position of the operator's extremities within a predefined safety zone which enables the required work activities to be performed; and a brake device capable of immediately stopping the moving machine element if the operator's extremities go beyond the safety area.

The safety brake device may include a transponder for detecting the operator's position, said transponder worn, directly or indirectly, by the operator.

The safety brake device may include photoelectric sensors or laser scanners, attached to the machine, for detecting the position of the operator's extremities.

The invention will be explained in more detail herein below with reference to the drawing, in which:

FIG. 1 shows, in diagrammatic form, the safety brake device according to the invention in combination with a circular saw, viewed from the side; and FIG. 2 is the safety brake device as viewed from the front.

DETAILED DESCRIPTION OF THE INVENTION

This problem is solved by the invention through the features delineated in the claims. Advantageous embodiments thereof are described herein and further in the claims.

Numerous significant advantages are achieved through the safety brake device according to the invention in comparison with the prior art.

For example, the safety brake device according to the invention contains few or no parts subject to wear, so that hardly any maintenance work is required and maintenance costs are reduced accordingly.

The invention also prevents a machine remaining in function when no operator is present in the working area. Finally, the operator's extremities are prevented from reaching the moving machine element, since this is stopped immediately through a brake device acting directly on the moving machine element. This makes it possible to reduce the stopping times of the moving machine elements to almost zero and thus prevent any injury to the operator.

Incidentally, the term "operator's extremities" is understood to mean their legs and, in particular, their arms. Naturally, it is also possible to provide an arrangement such that all of the operator's body parts are identified in such a way that they are relevant for the moving machine elements.

The invention possesses a detection system, in particular, a person-side detection system through which the position of the operator is detected. Transponders of a usual design can be used for this purpose, being for example incorporated in the gloves, but also in other articles of clothing which the operator has to wear when working on the machine, or also being worn by the operator on their body in another form.

The invention also possesses a detection system, and in particular a machine-side detection system for the position of the operator's extremities. This identifies the position of the operator's extremities in relation to the moving machine elements in order to prevent the operator's extremities from coming into contact with the moving machine elements and suffering an injury. Photoelectric sensors, laser scanners, or other known systems can, for example, be used for this purpose.

If the operator's extremities pass or intrude into the safety area thus defined, the detection system is activated and the moving machine element is brought to a stop directly by means of a brake device, preferably in the form of a brake caliper. This prevents the operator from being injured.

The brake caliper is attached in such a way that it acts indirectly or directly on the moving machine element. Consequently, the stopping times or stopping travel distances are virtually zero, and in any case are so small that there is no possibility of the operator injuring himself/herself.

If the emergency braking is initiated because, for example, the operator's hands have crossed the safety area, the brake caliper is closed and the moving machine element is brought to a stop.

The brake caliper is actuated by means of a control module, which also evaluates the position recognition information, and at the same time the energy supply to the machine is interrupted or enabled.

No complicated resetting of the safety device by the operator is necessary. This takes place when the machine is switched on.

The illustrated embodiment shows the application of the safety brake device according to the invention on the circular saw blade of a circular bench saw, in order to prevent the operator from being able to come into contact with the saw blade with their extremities, in the present case with their hands.

Specifically, the circular saw is equipped with a machine frame 1 in which an electric motor 2 is arranged and connected with the drive of the circular saw blade 4 via a belt drive 3.

As shown, a brake caliper 5 is provided below the actual working area of the circular saw blade 4, for example in the present case beneath the workbench, which can, via a suitable control, act directly on the circular saw blade 4 in such a way that this is brought to a stop within fractions of a second.

As can also be seen from the drawing, safety sensors 6 and sensors 7 for presence monitoring are also provided.

A control cabinet 8 contains the necessary controls, whereby it is possible to switch the entire machine on and off by means of a main switch 9.

The circular saw blade 4 is provided in a usual manner with a movable safety cover 10 as well as a fixed safety cover 11 on the bottom (see FIG. 2).

The belt drive 3 driven by the electric motor 2 acts on the actual drive 12 of the circular saw blade 4, as can clearly be seen from FIG. 2.

An operator 13 wearing, in the manner described above, a device, not represented in detail, for detection of their position, for example a transponder is sewn into the operator's glove, can work without hindrance within the vicinity of the circular saw blade 4 outside of the safety area 14 monitored by the safety sensors 6. However, if they move their hands into this safety area 14, the brake caliper 5 is immediately actuated through a corresponding control which, as described, acts on the circular saw blade 4 within fractions of a second and brings this completely to a stop.

In the following it will be described once again how the safety system shown is structured:

1. Arrangement for detecting the position of the operator 13, for example by means of a transponder or similar device, which only makes it possible to put the machine into operation when the operator 13 is present within the defined proximity or operating area of the machine. This ensures that the machine does not remain in operation when not supervised.

2. Arrangement for detecting the position of the operator's extremities 13 within a predefined safety zone which allows the working operations, that is to say the feeding and removal of the workpieces, to be performed.

Reflective materials from which gloves for the operator are manufactured can, for example, be used for this purpose. In order to detect the position of the hands, photoelectric sensors can be used which are positioned on the machine and so create a defined working area within which the operator can move his hands without danger. Other systems suitable for this purpose, such as optoelectric scanners, laser devices, transponder systems or similar, can also be used in order to detect the position of the operator's extremities.

3. Brake device which acts directly on the saw blade, thus bringing the saw blade immediately to a stop, as soon as the extremities leave the defined safety area, that is to say when the extremities approach too close to the saw blade or if the operator leaves the working area.

The brake device preferably consists of a brake caliper 5, which can be actuated electromechanically, pneumatically, hydraulically, purely through spring force or through another form of energy.

The brake device is arranged in such a way that the working area is not restricted; in the case of the circular saw, for example, below the working level and thus covered by the workbench. This brake device can be used in combination with the electromechanically braked drives provided on most machines.

4. Electronic or electric control with the following functions:
   a) only to permit the machine to function when the operator is present in the working area; the energy supply to the machine is interrupted for this purpose;
   b) control for the brake device, through which the saw blade 4 is immediately stopped and the drive energy interrupted as soon as the operator 13 leaves the working area;
   c) control for the brake device, through which the saw blade 4 is immediately stopped and the drive energy interrupted as soon as the operator's extremities 13 pass the safety zone 14.

The use of the described safety brake device makes it possible to provide the operator and in particular his extremities with the best possible protection during all working operations and in this way prevent accidents. In addition, the machine is shut down as soon as the operator leaves the defined working area, which means that the machine does not remain in function when not supervised and no other persons are endangered unnecessarily.

Should the operator come too close to the hazardous moving machine element, for example the circular saw, is stopped immediately so that no injuries are possible.

The simple construction design allows the total system to be built into all machines or also fitted subsequently, whereby a wide variety of technical solutions for detecting the position of the operator or his extremities are possible.

Regarding features of the invention not described in detail above, express reference is made to the description and the claims.

While the present invention has been particularly described, in conjunction with the specific preferred embodiment(s), it is evident that many alternatives, modifications, and variations will be apparent to those skilled in the art, in light of the foregoing description. It is therefore contemplated that the appended claims will embrace any such alternatives, modifications, and variations as falling within the true scope and spirit of the present invention.

Thus, having described the invention, what is claimed is:

1. A safety brake device for moving machine elements to prevent injury to the extremities of an operator of a machine for a distance of said operator from the moving machine element less than a predefined defined safety zone, comprising:
   a transponder worn, directly or indirectly, by the operator in an arrangement for detecting the operator's position, and permit operation of the machine only if the operator remains within a defined working area and shut down the machine as soon as the operator leaves the defined working area;
   photoelectric sensors or laser scanners attached to the machine in an arrangement for detecting the position of the operator's extremities within the safety zone which enables the required work activities to be performed; and
   a control module acting on a brake caliper of said safety brake device, said control module configured to determine that the operator's extremities go beyond the safety zone based on signals from the photoelectric sensors or laser scanners, and to function electrically or electronically to immediately stop the moving machine element when the operator's extremities go beyond the safety zone, and interrupting or enabling energy supply to said machine.

2. The safety brake device of claim 1, wherein the brake caliper is electrically operable.

3. The safety brake device of claim 1, wherein the brake caliper is hydraulically operable.

4. The safety brake device of claim 1, wherein the brake caliper is pneumatically operable.

5. The safety brake device of claim 1, wherein the brake caliper is mechanically operable.

6. The safety brake device of claim 1, wherein said safety device is activated automatically each time the machine is started.

7. A safety brake device for moving machine elements to prevent injury to the extremities of the operator of a machine when the distance of said operator from the moving machine element is less than a defined safety area, comprising:
   a first detector arranged for detecting the operator's position, in order to permit operation of the machine only if the operator remains within the defined working area and shut down the machine as soon as the operator leaves the defined working area;
   a second detector arranged for detecting the position of the operator's extremities within a predefined safety zone which enables the required work activities to be performed;
   a brake device capable of immediately stopping the moving machine element if the operator's extremities go beyond the safety area; and
   a control module for controlling said brake device, said control module;
   determining the position of the operator based on signals from the first detector;
   determining the position of the operator's extremities based on signals from the second detector:
   permitting the machine to function when the operator is present in the working area;
   interrupting the energy supply to the machine;
   immediately stopping said moving machine element as soon as the operator leaves the working area; and/or
   immediately stopping said moving machine element and interrupting said drive energy as soon as the operator's extremities pass the safety area.

8. The safety brake device of claim 7, wherein the first detector includes a transponder for detecting the operator's position, said transponder worn, directly or indirectly, by the operator.

9. The safety brake device of claim 7, wherein the second detector includes photoelectric sensors or laser scanners, attached to the machine, for detecting the position of the operator's extremities.

10. The safety brake device of claim 7, wherein the brake device includes a brake caliper which acts on the moving machine element by a control.

11. The safety brake device of claim 10, wherein the control module for the brake device functions electrically or electronically.

12. The safety brake device of claim 10, wherein the brake caliper is electrically operable.

13. The safety brake device of claim 10, wherein the brake caliper is hydraulically operable or pneumatically operable.

14. The safety brake device of claim 10, wherein the brake caliper is mechanically operable.

15. The safety brake device of claim 7, including an activation module for automatic activation each time the machine is started.

16. A safety brake device for moving machine elements to prevent injury to the operator of a machine, comprising:
   an arrangement for detecting the position of the operator's extremities within a safety area, wherein the arrangement detects the position of the operator, in order to permit operation of the machine only if the operator remains within a defined working area in which the machine can be fed with work pieces or work pieces can be removed from the machine, wherein the machine is shut down as soon as the operator leaves the working area;
   a brake device for immediately stopping the moving machine element if the operator's extremities go beyond the safety area; and
   a control module for controlling said safety brake device, said control module;
   determining the position of the operator's extremities and the position of the operator based on signals from the arrangement;
   permitting the machine to functions when the operator is present in the working area;
   immediately stopping said moving machine element as soon as the operator leaves the working area by interrupting the energy supply or drive energy to the machine; and/or
   immediately stopping said moving machine element and interrupting said drive energy as soon as the operator's extremities pass the safety area.

* * * * *